（12）United States Patent
Lavi

(10) Patent No.: US 7,697,049 B1
(45) Date of Patent: Apr. 13, 2010

(54) BETTER SNR RATIO FOR DOWNSIZED IMAGES USING INTERLACED MODE

(75) Inventor: Yoav Lavi, Raanana (IL)

(73) Assignee: Samsung Electrics Co., Ltd., Gyeonggi-do (KR)

( * ) Notice: Subject to any disclaimer, the term of this patent is extended or adjusted under 35 U.S.C. 154(b) by 989 days.

(21) Appl. No.: 11/418,587

(22) Filed: May 4, 2006

Related U.S. Application Data

(60) Provisional application No. 60/678,033, filed on May 4, 2005.

(51) Int. Cl.
*H04N 3/14* (2006.01)
*H04N 5/335* (2006.01)

(52) U.S. Cl. ..................... 348/305; 348/362

(58) Field of Classification Search ............ 348/207.99, 348/220.1, 221.1, 222.1, 272–275, 277, 280–282, 348/302, 305, 308, 311, 312, 316, 317, 320–324; 257/231
See application file for complete search history.

(56) References Cited

U.S. PATENT DOCUMENTS

| | | | | |
|---|---|---|---|---|
| 4,500,914 A | * | 2/1985 | Watanabe et al. | 348/280 |
| 4,802,001 A | * | 1/1989 | Tabei et al. | 348/280 |
| 4,851,917 A | * | 7/1989 | Ohzu | 348/316 |
| 5,251,019 A | * | 10/1993 | Moorman et al. | 348/275 |
| 5,521,636 A | * | 5/1996 | Nakayama et al. | 348/222.1 |
| 7,259,788 B1 | * | 8/2007 | Olding et al. | 348/273 |
| 2003/0227552 A1 | * | 12/2003 | Watanabe | 348/220.1 |
| 2004/0189844 A1 | * | 9/2004 | McCaffrey et al. | 348/308 |
| 2005/0168610 A1 | * | 8/2005 | Kobayashi | 348/320 |

* cited by examiner

*Primary Examiner*—Jason Whipkey
*Assistant Examiner*—Dennis Hogue
(74) *Attorney, Agent, or Firm*—Harness, Dickey & Pierce, P.L.C.

(57) ABSTRACT

Various embodiments of the invention comprise imaging systems and methods for an interlaced scan of an image sensor array. An exemplary method is described in which an image sensor array is exposed to light for a period of time to generate voltage levels representative of array pixels. The voltage levels of a first field of the array are scanned, the first field comprising a number of row-pairs of the array. The voltage levels of a second field of the array are also scanned, the second field comprising a different set of row-pairs interlaced with the row-pairs of the first field. A set of image data from the first field and a set from the second field are generated. Various row-pairs may be averaged in generating the sets of image data. Additionally, exemplary imaging systems are described with various configurations for scanning an image sensor array in interlaced mode.

23 Claims, 10 Drawing Sheets

BETTER SNR RATIO FOR DOWNSIZED IMAGES USING INTERLACED MODE

CROSS-REFERENCE TO RELATED APPLICATIONS

This application claims priority from co-pending U.S. Provisional Patent Application No. 60/678,033 filed May 4, 2005, entitled "BETTER SNR RATIO FOR DOWNSIZED IMAGES USING INTERLACED MODE," which is hereby incorporated by reference, as if set forth in full in this document, for all purposes. The respective disclosure of this application is incorporated herein by reference in its entirety for all purposes.

FIELD OF THE INVENTION

The present invention relates to image sensors in general and, in particular, to the scanning of image sensor arrays.

BACKGROUND OF THE INVENTION

In devices using image sensor arrays, reduced resolution images are often output for purposes of image preview. For example, view finders in digital cameras often display a reduced resolution motion video image to illustrate a preview of a captured image. This may be followed by a full resolution capture when a user presses a capture button on the camera, or on a touch screen display. This functionality may also be found in cell phone cameras and other mobile devices using such image sensors.

There are certain attributes for a preview mode that may be beneficial. For example, a higher scan rate may be desirable to provide motion artifact clean video. Also, a relatively high signal to noise ratio (SNR) may be advantageous, because preview video is real-time, and often does not have the benefit of post-capture image processing to remove noise, increase gain, and so on. However, these issues can present a strain on power supply. Also, unlike a typical image capture, the camera may be in preview mode for long periods of time, and a series of images may be shown in succession. The recurring scans, and ongoing display of images, can also put significant strains on power. Because of the finite power supply often associated with digital cameras, cell phones, and other mobile devices with integrated cameras, these power consumption issues can be very limiting.

There are additional challenges as well, as although higher SNR may be achieved with long exposure time, this may come at the cost of lower scan rate. High quality preview may be achieved by filter-based downscaling of the image, but that may imply high power consumption. Low power consumption reduced resolution scan can be achieved with sub-sampled scan, but this may impact the SNR, as light accumulated in the non-scanned pixels may be lost.

Binning, wherein groups of same color neighboring pixels (for example, squares of 2×2 same color pixels) are accumulated right after the scan, may be used in certain circumstances to reduce power consumption. While this method may not have the benefit of a higher scan rate when the image is scanned at full resolution, reasonable SNR pictures may be achieved using simple low power consumption circuits for the addition of neighboring pixel values.

In light of this range of issues, it is desirable to identify methods and devices for providing reduced resolution video at adequate frame rates and SNR, while limiting power consumption.

BRIEF SUMMARY OF THE INVENTION

Various embodiments of the invention comprise imaging systems or methods for scanning an image sensor array in an interlaced mode. Exemplary methods are described wherein the image sensor array is exposed to light for a period of time to generate voltage levels representative of array pixels. The voltage levels of a first field of the array are scanned, the first field comprising a number of row-pairs of the array. The voltage levels of a second field of the array are also scanned, the second field comprising a different set of row-pairs interlaced with the row-pairs of the first field. A first set of image data comprising a first image is generated from the scan of the first field. A second set of image data comprising a second image is generated from the scan of the second field.

In various embodiments, subsets of the row-pairs from the second field are averaged, and the second set of image data comprises the averaged row-pairs. The averaging may comprise averages of subsets of the voltage levels from the second field. Alternatively, the voltage levels may be converted to sets of digital data each representative of a row-pair of the second field, and the averaging may comprise averages of subsets of the sets of digital data.

In one embodiment, a first row-pair and a second row-pair from the second field are averaged. The first and second row-pair are adjacent to a selected row-pair of the first field. The first image is displayed, including the selected row-pair. The second image is then displayed including the averaged row-pair, and the averaged row-pair is displayed in the same location as the selected row-pair. The first set of image data and the second set of image data may each be displayed for a successive period of time. Each period of time may comprise approximately one-half the exposing period of time.

The image sensor array may, in other embodiments, comprise more than two fields. In such embodiments, for example, voltage levels from a third field of the image sensor array are scanned, the third field comprising a third set of row-pairs interlaced with the first and second sets of row-pairs. In such embodiments, a third set of image data from the scan of the third field is then displayed, as well. Each set of image data is displayed for a period of time, and periods of time combined are roughly equal to the exposing period of time. More than three fields may be scanned, as well.

In a number of embodiments, the method is repeated, as the image sensor array is re-exposed to light and scanned, and then sets of image data based on the scans of each field are generated as described according to one or more of the embodiments above. The image sensor array may comprise a CMOS imaging sensor with a Bayer filter mosaic.

In one embodiment, an exemplary imaging system for scanning the rows of an image sensor array is described. The system includes an image sensor array comprising a number of rows of pixels. The pixels are associated with a voltage level generated by exposing the image sensor array to light for a period of time. A measurement unit is configured to measure the voltage levels associated with certain subsets of the pixels. A control unit is configured to control the measurement unit to scan voltage levels for a first and a second field of the image sensor array, each field comprising a number of interlaced row-pairs of the image sensor array. The system may also include an image processing unit configured to generate sets of image data from the scans of the first and second fields, respectively.

In various embodiments, the imaging system may include an averaging unit, configured to average subsets of the row-pairs from the second field. The second set of image data may comprise the averaged row-pairs. The averaging unit may comprise a low-pass filter configured to average subsets of the voltage levels from the second field. In another embodiment, the system further comprises an analog to digital converter configured to convert the voltage levels from the second field to sets of digital data each representative of a different row-pair of the second plurality of row-pairs. In this embodiment, the averaging unit is configured to average subsets of the sets of digital data. In yet another embodiment, the averaging unit is configured to average a first row-pair and a second row-pair from the second field, the first and second row-pairs each adjacent to a selected row-pair of the first field. A display unit may be configured to display the selected row-pair, and then display the averaged row-pair in the same location.

As noted, the imaging system may further comprise a display, configured to display the first and second sets of image data for periods of time. Each set of image data may, in one embodiment, be exposed for one-half of the exposure time. It is worth noting that the image sensor array may be configured with additional interlaced fields. The image data from each of these additional fields may be displayed for a distinct period of time, wherein the first, second, and additional periods of time combined roughly equal the exposing period of time. As noted above, the image sensor array may comprise a CMOS imaging sensor configured with a Bayer filter mosaic.

In an alternative embodiment, an imaging system for generating sets of image data is described. This embodiment again includes an image sensor array comprising a number of rows of pixels, the pixels associated with voltage levels generated by exposing the image sensor array to light for a period of time. Again, a measurement unit measures the voltage levels associated with the pixels. A control unit is configured to control the measurement unit to scan voltage levels for a first and second field of the image sensor array, the first and second fields each comprising a number of rows of the image sensor array. Subsets of the rows of the fields are interlaced. An averaging unit is configured to average selected rows of the second field, and an image processing unit configured to generate sets of image data comprising a set of image data from the scans of the first and second fields. In one embodiment, the image sensor array produces grayscale images, and the rows of the array alternate, at each row, between a row of the first field and a row of the second field.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 2B-2C illustrate exemplary scanning patterns for the image sensor array of FIG. 2A.

DETAILED DESCRIPTION OF THE INVENTION

Various embodiments of the invention comprise imaging systems and methods for an interlaced scan of an image sensor array. In one embodiment, an image sensor array is exposed to light for a period of time to generate voltage levels representative of array pixels. The voltage levels of a first field of the array are scanned, the first field comprising a number of row-pairs of the array. The voltage levels of a second field of the array are also scanned, the second field comprising a different set of row-pairs interlaced with the row-pairs of the first field. A set of image data from the first field, and a set from the second field, are generated. Various row-pairs may be averaged in generating the sets of image data. Additionally, exemplary imaging systems are described with various configurations for scanning an image sensor array in interlaced mode.

The following description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following imaging systems and methods may be components of a larger system, wherein other procedures may take precedence over or otherwise modify their application. Also, a number of steps may be required before, after, or concurrently with the following embodiments.

Figure 1:
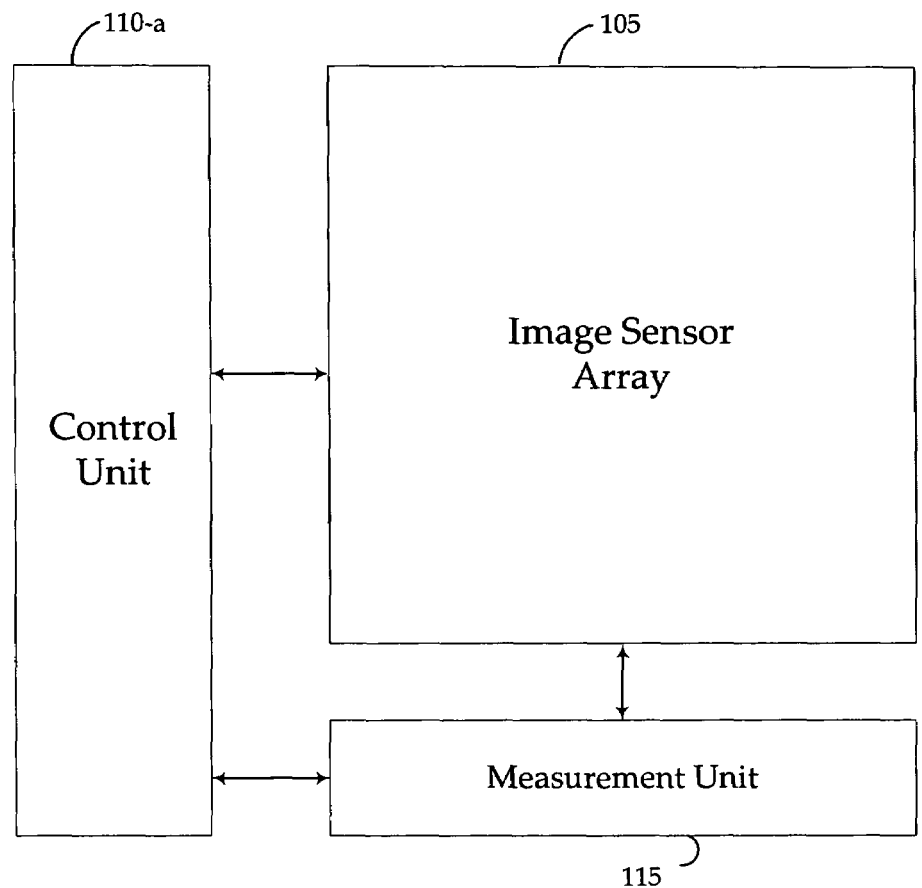
FIG. 1 is a simplified block diagram illustrating a device comprising an imaging system configured according to various embodiments of the present invention.

FIG. 1 is an exemplary embodiment of the invention comprising a device 100 for generating analog signals representative of the interlaced fields of an image. This exemplary embodiment of the device 100 includes an image sensor array 105 comprised of a number of rows of pixels. The image sensor array 105 may, for example, comprise a CMOS image sensor. However, there are a variety of image sensor arrays known in the art to which the invention may be applied. Generally speaking, image sensor arrays are made up of a number of rows of pixels that convert light into an electric charge and process it into a voltage representative of the charge. The pixels of the array may be configured to collect and generate signal charges in any manner known in the art. Pixels often comprise photogates or photodiodes. Photodiodes have ions implanted in the silicon to create (p-n) metallurgical junctions that can store photogenerated electron hole pairs in depletion regions around the junction. Photogates use MOS capacitors to create voltage-induced potential wells to store the photogenerated electrons.

In typical CMOS image sensors, each pixel has its own charge-to-voltage conversion. Each CMOS pixel may have an amplifier or there may be an amplifier for each row. In various embodiments, the particular row and column to be accessed and read, and the direction of the read, may be controlled by a control unit 110-a. Regardless of the particular configuration of the image sensor array, a voltage level representative of the pixel's charge is read by a measurement unit 115. The pixels associated with the voltage levels to be read may comprise all the pixels of an image sensor array or any subset thereof.

A measurement unit 115 is configured to measure the voltage level associated with each of a number of pixels. In some embodiments, a correlated double sampling technique is used to measure the voltage levels. The pixel output is sampled twice at different times during the pixel period, and the output is the difference of the two samples. This output may then be transmitted as an analog signal to an analog to digital converter (ADC) for further processing. The first sample is generally the reference level and the second sample corresponds to the data signal. This pseudo differential sampling reduces some of the correlated and other noise between the reference and the data signals. In some embodiments, other techniques may also be used to improve measurement, such as Double Delta Sampling, programmable amplification, video compression, dynamic range enhancement, discrete cosine transform, and intensity sorting.

The control unit 110-a is configured to control the read progression of the measurement unit 115. In some embodiments, the device 100 employs a readout which involves selecting a row and then reading out each pixel of the column by addressing them individually. Column readout may be either sequential or non-destructive. In sequential readout, pixels in each column are read in a sequential manner, while in non-destructive mode, pixels may be read randomly. A shift register in the control unit may be used to generate the control signals for sequential readout, and a decoder may be used for non-destructive readout. In other embodiments, window readout and skip readout may be employed, in which fewer pixels are read out from the array. The control unit 110-a includes a clock unit to produce sampling and control signals accordingly. The control unit 110-a may comprise one or more processors or processor cores configured to perform the functions described above. For example, the control unit 110 may be an Application Specific Integrated Circuit (ASIC), or a general purpose processor or processor core adapted to perform the applicable functions. In other embodiments, other types of integrated circuits may be used (e.g., Structured/Platform ASICs, Field Programmable Gate Arrays (FPGAs) and other Semi-Custom ICs), which may be programmed in any manner known in the art. In a number of embodiments, the image sensor array 105, the control unit 110-a, and the measurement unit 115 comprise a single integrated circuit.

In some embodiments, the control unit 110-a controls the measurement unit 115 to read across a selected row of the image sensor array in a first direction by making a first measurement of the voltage levels representative of at least a subset of the pixels of the row for a given pixel period. The control unit 110-a further controls the measurement unit 115 to read across another selected row (which may, but need not, be adjacent the first row) to make a second measurement of the voltage levels representative of at least a subset of the pixels. These measurements may be of each pixel in a row, half the row, or any other pixel subset of the row. The process may be repeated for any selection of rows. The initial measurement direction may, in some embodiments, be in either direction. The vertical progression may be either up or down, as well. The measurement unit 115 transmits analog signals representative of the measurements. The analog signals may comprise the respective measurements (i.e., the measured voltage level may comprise the transmitted analog signal), or the analog signals and the measurement output may be different signals. As noted, this process may then be repeated for any number of additional rows for the pixel period at issue. Moreover, the process (for the one or more of the rows) may be repeated for any number of subsequent pixel periods.

Figure 2A:
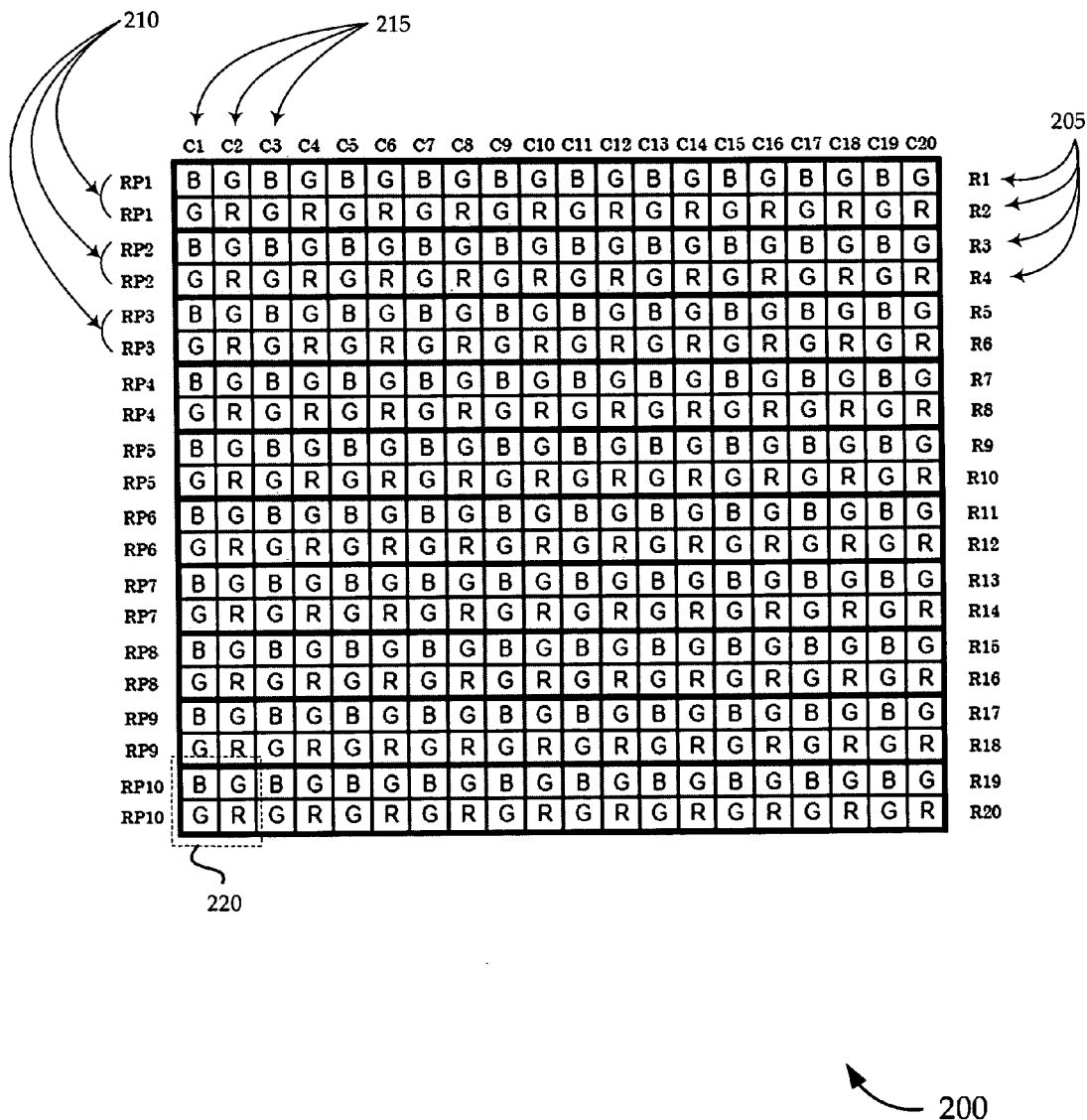
FIG. 2A illustrates an exemplary image sensor array for an imaging system configured according to various embodiments of the present invention.

Turning to FIG. 2A, an exemplary image sensor array 200 is illustrated for an imaging system configured according to various embodiments of the present invention. In this exemplary embodiment, the image sensor array comprises a CMOS image sensor. However, as noted above, in other embodiments there are a variety of alternative image sensor arrays known in the art that may be used. The exemplary array 200 includes twenty rows of pixels 205 (R1, R2, R3, ... R20). The rows 205 each comprise a number of pixels, the pixels organized into columns 215 (C1, C2, C3, ... C20). In other embodiments, there may be other numbers of columns, and rows.

In this embodiment, a Bayer filter configuration is used for arranging RGB color filters on the image sensor array 200. A Bayer filter includes filter units 220 of 2×2 pixels, recurring throughout the array, with two green pixels diagonal to one another. There are, thus, two types of Bayer data lines: "red" lines and "blue" lines. Red lines carry green and red Bayer components and, in this embodiment, comprise the even rows (R2, R4, R6, etc.) with the green and red data interleaved. Blue lines carry interleaved blue and green Bayer components, and comprise the odd rows (R1, R3, R5, etc.) of this embodiment.

Although this embodiment includes a Bayer filter, other types of color filters may be used, as well. In many color image sensors, each pixel in the image sensor array is associated with a color filter that passes light with certain wavelength properties to thereby capture a color image. Color filter arrays typically include a combination of red, blue and green filters, although other color schemes are used, as well. Color filters often have a period of two columns in the horizontal dimension and two rows in the vertical dimension. Hence, the array includes identical units of 2×2 pixels. Typical units (e.g., a Bayer filter) include a red filter, a blue filter, and two green filters. The associated pixels may be referred to by the color of the corresponding filter. The range of color information is, therefore, typically contained in adjacent rows. The rows of FIG. 2A are, thus, organized into row-pairs 210: row-pair 1 (RP1) comprising rows 1 and 2, row-pair 2 (RP2) comprising rows 3 and 4, row-pair 1 (RP3) comprising rows 5 and 6, and so on. In other embodiments, no color filter is used, and each pixel may, thus, receive light in an unfiltered fashion.

Figures 2B, 2C:
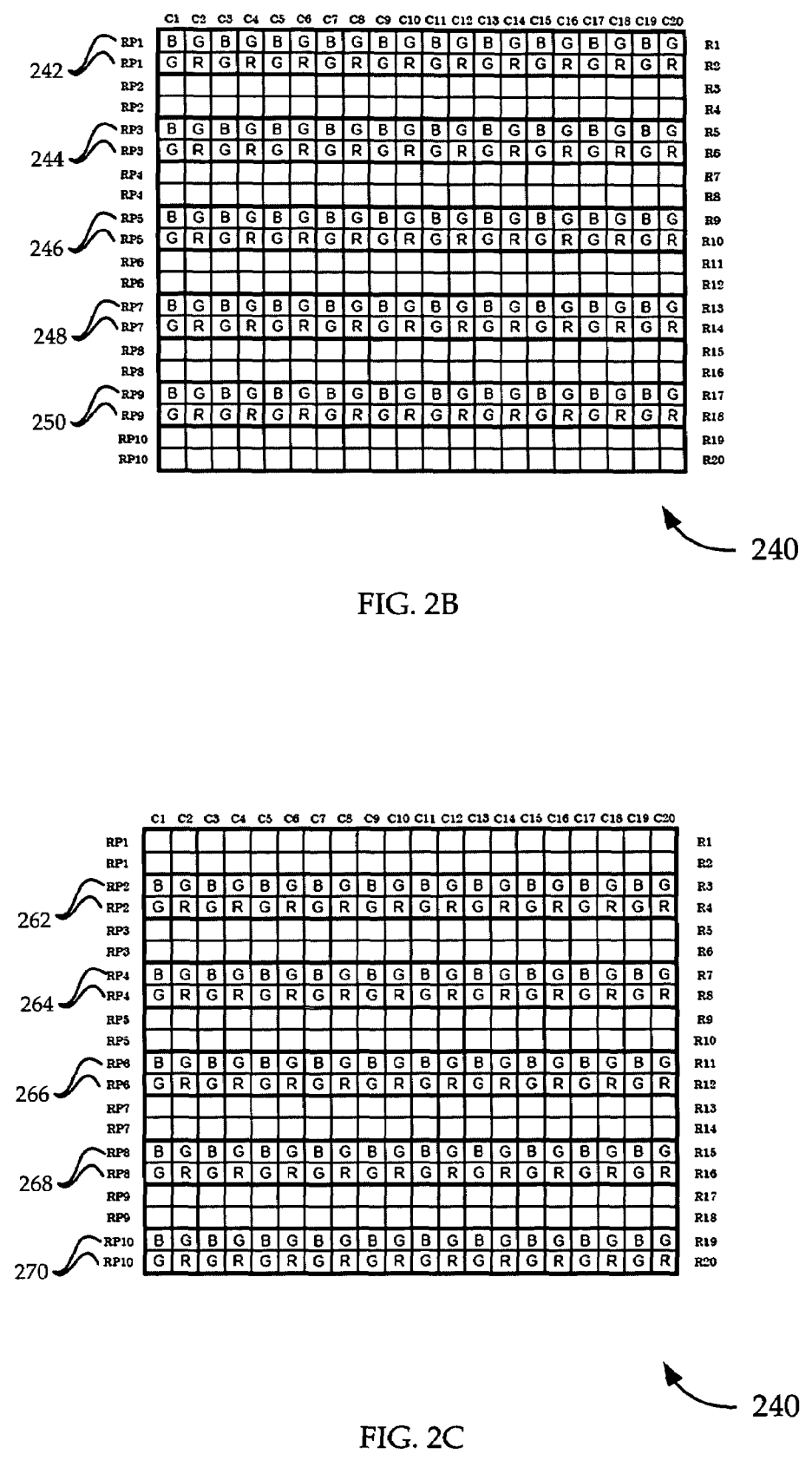

Turning to FIGS. 2B and 2C, an exemplary scanning pattern is illustrated for the CMOS image sensor 200 with the Bayer filter mosaic illustrated in FIG. 2A. Assume that light is exposed to the image sensor array for a period of time to generate a voltage level for each pixel of the image sensor array. In FIG. 2B, a scan pattern for voltage levels of the image sensor array 240 during a first period of time is illustrated. In this embodiment, row-pairs are scanned in the following progression: row-pair 1 242, then row-pair 3 244, then row-pair 5 246, then row-pair 7 248, then row-pair 9 250 (i.e., the rows would be scanned in the following order: R1, R2, R5, R6, R9, R10, R13, R14, R17, R18). In this example, these odd row-pairs (RP1, RP3, RP5, RP7, RP9) comprise the first field. In FIG. 2C, a scan pattern for the image sensor array 240 during the subsequent period of time is illustrated. In this embodiment, row-pairs are scanned in the following progression: row-pair 2 262, then row-pair 4 264, then row-pair 6 266, then row-pair 8 268, then row-pair 10 270 (i.e., the rows would be scanned in the following order: R3, R4, R7, R8, R1, R12, R15, R16, R19, R20). In this example, these even row-pairs (RP2, RP4, RP6, RP8, RP10) comprise the second field. These row-pairs are, therefore, interlaced with the first plurality of row-pairs. Thus, for each field being scanned, either even or odd row-pairs of image sensor array 200 will be scanned, according to the input from the control unit.

Thus, rows are scanned in a manner similar, in some respects, to an interlace mode that is often used to improve resolution of a general display (e.g., a television, computer monitor, etc). In interlace mode (unlike progressive mode), fields, rather than full frames, are displayed. For example, in traditional n-way interlace mode, if n=2 in the first field ("odd" field), rows 1, 3, 5 and so on will be displayed; in the second field ("even" field), rows 2, 4, 6 and so on will be displayed. After every two fields in the case of n=2 (and after each n fields in the general case), display order will restart, so that the first and then second fields, etc. of the next frame will be displayed. Thus, an interlace mode comprises at least a first field and a second field, wherein lines (i.e., one or more rows) of the second field are drawn between lines (i.e., one or more rows) of the first. However, according to certain embodiments of the invention, row-pairs (not rows) are interlaced. Also, the interlace mode relates to the scan of image sensor array.

Turning back to the exemplary n=2 scanning pattern discussed above for FIGS. 2b-2C, the measurement unit 115 outputs an analog signal representative of the pixels of the scanned rows in the following order: R1, R2, R5, R6, R9, R10, R13, R14, R17, R18, R3, R4, R7, R8, R11, R12, R15, R16, R19, R20. In some embodiments, the frame rate will be 1/n that of the field rate (i.e., in the n=2 embodiment above, the frame rate is ½ that of the field rate). Assuming that flicker effects can be avoided or at least mitigated (as shown below), the frequency which may determine smoothness of motion is the field frequency rather than the frame frequency. Thus, in certain embodiments, the maximum exposure duration available may be up n times as much as a full resolution image with the same smoothness of motion, providing improved SNR (i.e., the exposure period may, therefore, comprise 1/frame rate).

In the embodiments described in detail above, the n-way interlace mode generally addressed is for n=2. However, it should be clear to those skilled in the art that other interlaced scan patterns are within the scope of the invention. Returning to FIG. 2A, consider n=3. In this example, a scan might proceed in the following progression: Field 1: RP1, RP4, RP7; then Field 2: RP2, RP5, RP8; then Field 3: RP3, RP6, RP9 (assume 9 row-pairs in this example). The measurement unit 115 may, therefore, output an analog signal representative of the pixels of the scanned rows in the following order: R1, R2, R7, R8, R13, R14, R3, R4, R9, R10, R17, R18, R5, R6, R11, R12, R19, R20. Alternatively, consider n=4. In this example, a scan might proceed in the following progression: Field 1: RP1, RP5; then Field 2: RP2, RP6, then Field 3: RP3, RP7, then Field 4: RP4, RP8 (assume 8 row-pairs in this example). The measurement unit 115 may, therefore, output an analog signal representative of the pixels of the scanned rows in the following order: R1, R2, R9, R10, R3, R4, R11, R12, R5, R6, R13, R14, R7, R8, R15, R16. Although the exemplary embodiment illustrates a limited number of rows, other embodiments may include any number of rows (e.g., 1024 or 2056). Also, it is again worth noting that although the example uses a Bayer filter wherein the range of RGB color information is contained in two rows, other filters may be used (i.e., where color data is contained within more or fewer rows, or where there is no color data).

Figure 3A:
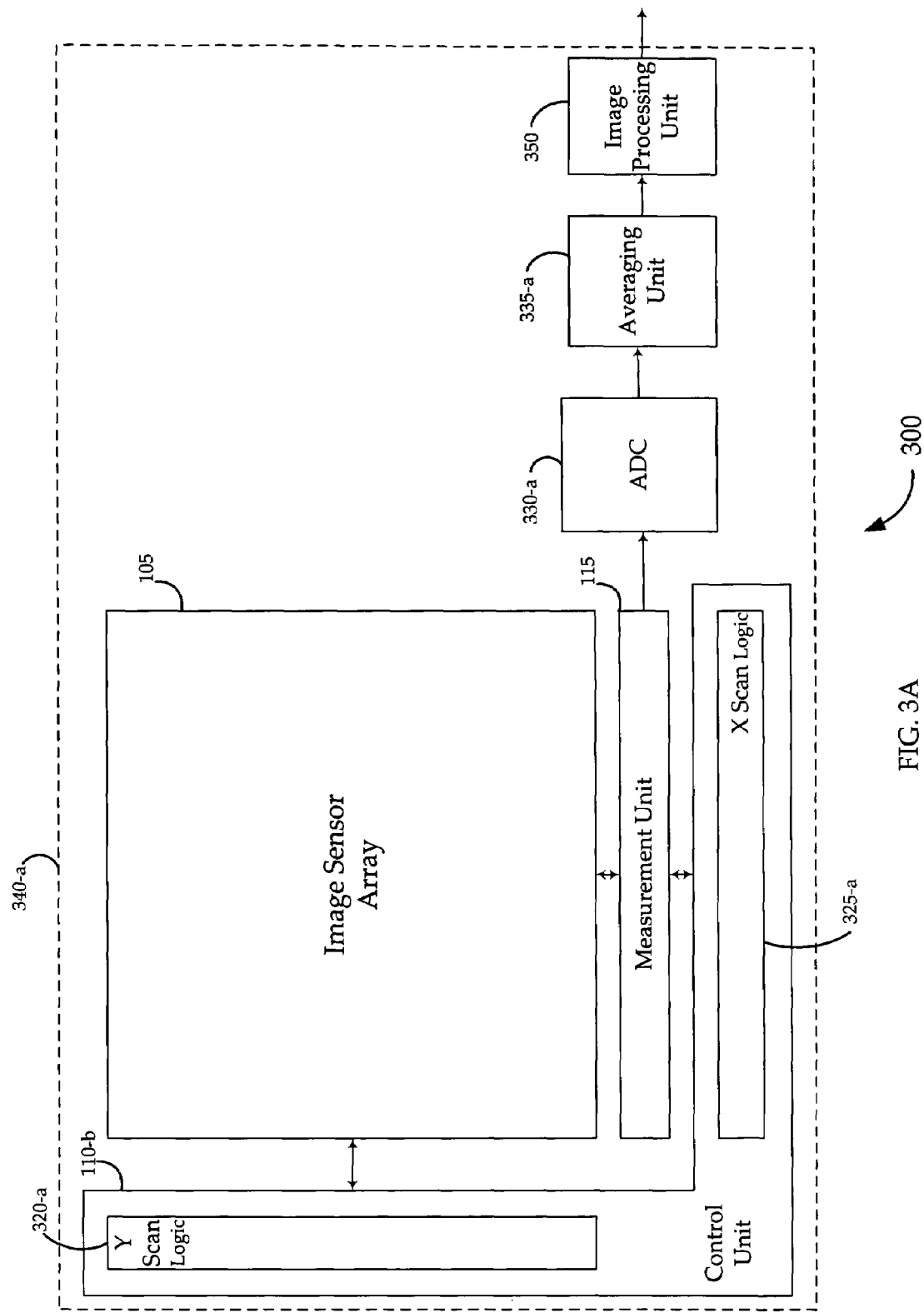
FIG. 3A is a simplified block diagram illustrating a configuration of an imaging system including an averaging unit according to various embodiments of the present invention.

FIG. 3A is an exemplary embodiment 300 of the invention comprising a device 340-a for scanning an image sensor array, including an averaging unit. In this embodiment, the image sensor array 105 comprises a CMOS image sensor. The control unit 110-b in this embodiment includes a Y Scan Logic unit 320-a and an X Scan Logic unit 325-a. The control unit 110-b may use these logic components to thereby select the row and column information for the pixels to be read. The measurement unit 115 measures the voltage levels associated with each of the selected pixels. This read may be accomplished as set forth above, or in any other manner known in the art. As noted above, the voltage levels of the pixels of a row may be read in a first direction across a row. In this embodiment, an analog signal representative of these measurements is transmitted to an ADC 330-a. This scan, and subsequent transmission, of the analog signals is repeated for each of the rows of two or more fields in a manner described above. The analog signals received by the ADC 330-a may comprise a voltage or current representative of the measured voltage levels, and the measurement unit 115 may include one or more drivers to drive the analog signal.

The ADC 330-a may comprise a direct conversion ADC, a successive-approximation ADC, a delta-encoded ADC, a ramp-compare ADC, a pipeline ADC, a Sigma-Delta ADC, or any other ADC known in the art. As noted above, the measurement unit 115-b may repeat the measurements for each of n-number of fields of the array over a given pixel period. Analog signals representative of each read are transmitted by the measurement unit 115 to the ADC 330-a and converted to raw digital sets of data. Thus, the ADC 330-a may comprise analog preprocessing as well as conversion from analog to digital. In this embodiment, this raw digital data may comprise Bayer data, while in other embodiments it may comprise other digital data comprising a direct conversion of the analog signals.

The raw digital sets of data are then output to an averaging unit 335-a. Flicker artifacts may occur if interlaced video fields are displayed on the same output rows, because edges may show on different output rows if they are acquired from vertically shifted fields of the image. The averaging unit 335-a may be used to mitigate or avoid these flicker artifacts. By way of example, turning back to FIG. 2A and assuming n=2, odd row-pairs (RP1, RP3, RP5, etc.) which are scanned at odd fields may be output as are. However, at even fields, when the even row-pairs (RP2, RP4, RP6, etc.) are scanned, interpolated values may be output by averaging two neighboring even row-pairs (e.g., for the even field output at the location of an RP3 output, an average of RP2 and RP4 are output; for the even field output at the location of an RP5 output, an average of RP4 and RP6 are output). Thus, in such an embodiment, odd row-pairs which are scanned at odd fields are output as are, while even row-pairs scanned at even fields are interpolated to evaluate odd row-pairs located in between pairs of even row-pairs. The output from the averaging unit 335-a is received and processed by an image processing unit 345. For each exposure period, image data is produced which may include discrete sets of image data for each field, each set comprising an image. The output of an image processing unit is discussed in greater detail below.

Figure 3B:
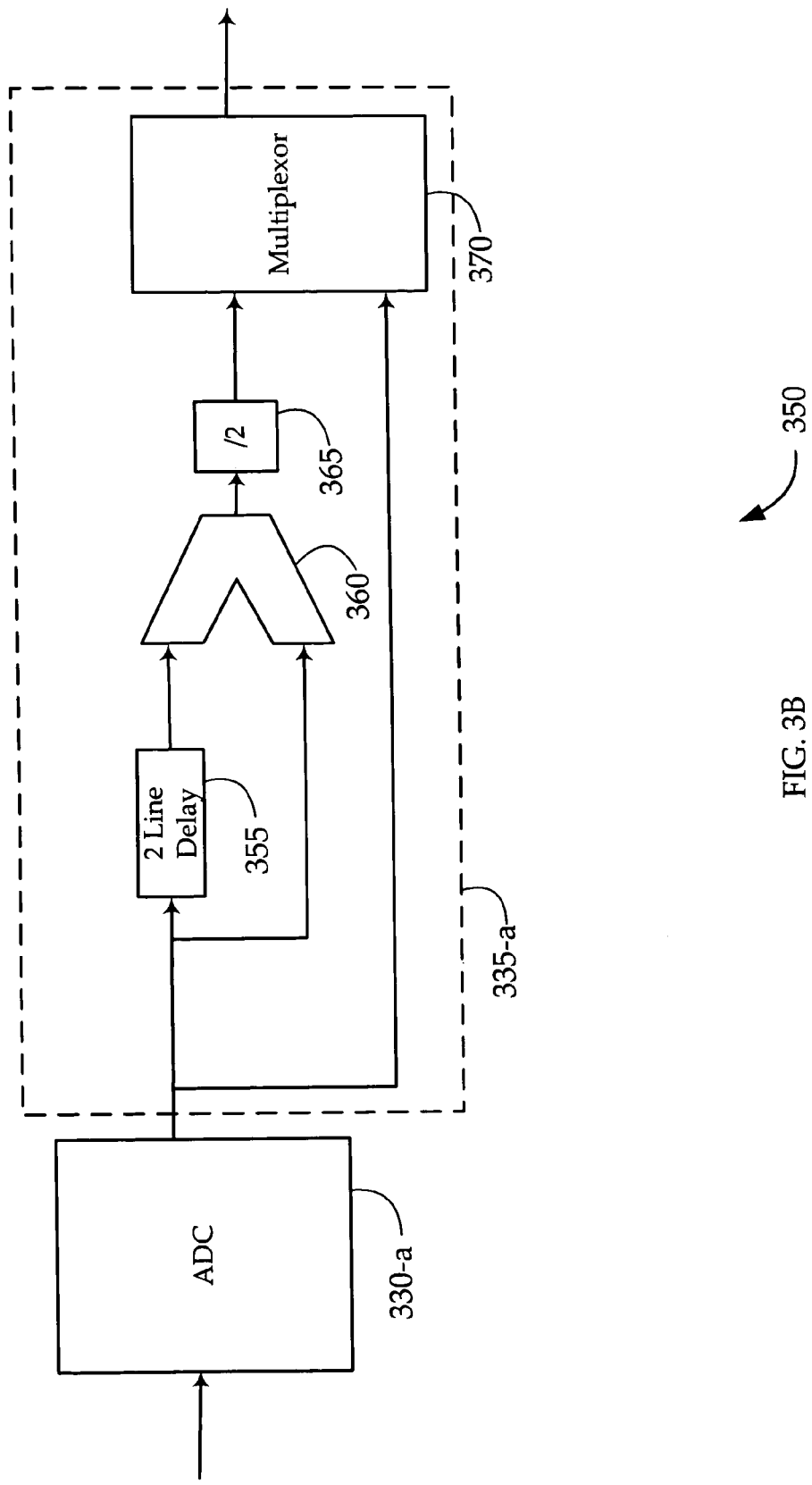
FIG. 3B is a simplified block diagram illustrating a component of the imaging system of FIG. 3A.

These concepts merit additional discussion so, turning to FIG. 3B, an exemplary embodiment 350 of the averaging unit 335-a is illustrated. When an odd field is scanned, and output from the ADC 330-a, multiplexer 370 selects that data for output.

When an even field is scanned, 2-Line-Delay block 355 delays output of the value of each of the pixels of the rows of the even row-pair (e.g., RP6) by two rows. These delayed values are added by Adder 360 to the values of the pixels of the rows of the next even row-pair (e.g., RP8) which are not delayed. The result of the addition is divided by 2 in /2 block 365. In other words, each of a series of pixels from a current even row-pair (e.g., RP8), and each of a series of corresponding pixels for the previous even row-pair (e.g., RP6) delayed by two lines are summed, then divided by 2. An average for each pixel from the non-delayed even row-pair and each corresponding pixel from the delayed even row-pair is output. This average value will be selected by Multiplexer 370 when an even field is scanned. It should be noted that /2 block 365 may be implemented by selection of the higher order output bits from Adder 360 and, thus, need not comprise hardware.

Consider, for example, an average using the exemplary row-pairs from FIG. 2A, e.g., RP6 and RP8. Thus, assume that RP6 is delayed two lines and, thus, the following pixel averaging could take place between RP6 and RP8: ((R11, C1)+(R15,C1))/2, ((R11, C2)+(R15,C2))/2, ((R11, C3)+(R15,C3))/2, . . . ((R12, C19)+(R16,C19))/2, ((R12, C20)+(R16,C20))/2). As noted above, this averaging of the raw digital output is for exemplary purposes only, and there are a number of alternative averaging configurations and techniques that could be used within the scope of this invention.

As evident to one of ordinary skill in the art, the functions of odd and even row-pairs can be easily interchanged (i.e., even row-pairs which are scanned at even fields could be output as are, while odd row-pairs scanned at odd fields could be interpolated to evaluate even row-pairs located in between pairs of odd row-pairs. It should also be noted that the embodiment includes a delay of two rows in the even fields, and no delay in odd lines. This disparity would not be desirable to the overall operation of the image sensor device. However, such a disparity is easily solved in a number of ways (e.g., with a requisite delay component integrated into the multiplexer 370, to align the timing of the odd field output with the even field output by changing the scan boundaries to start two rows earlier for even fields, or by using an additional 2 line delay unit separate from the Mux 370).

While the above example describes a specific example of the functioning of the averaging unit, it should be evident that the configuration and functionality of the averaging unit 355-a is for exemplary purposes only. There are a variety of methods and configurations known in the art to average rows or row-pairs of pixels from an interlaced digital output. For example, different averaging weights and row combinations may be used. Also, the characteristics of the digital data may be analyzed to determine whether flicker is likely, and only average data which meets certain threshold conditions. However, this additional signal processing may come at the expense of an unwanted delay for preview mode, as well as additional power consumption.

Figure 4:
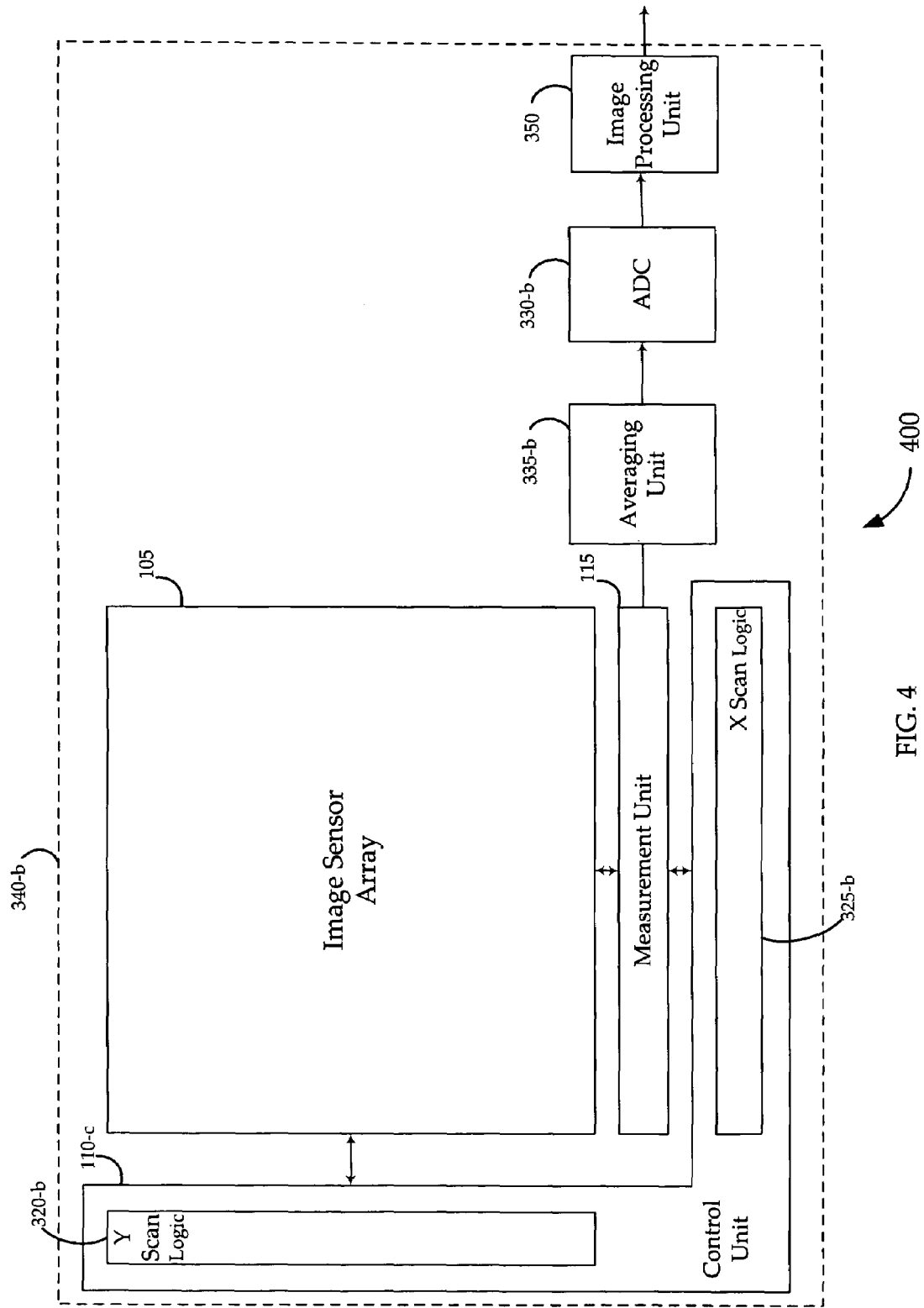
FIG. 4 is a simplified block diagram illustrating an alternative configuration of an imaging system including an averaging unit according to various embodiments of the present invention.

FIG. 4 is an exemplary embodiment 400 of the invention comprising an alternative configuration of a device 340-b to be used for scanning an image sensor array and including an averaging unit. In this embodiment, the measurement unit 115 again measures the voltage levels associated with each of the selected pixels of the array. Analog signals representative of each read are transmitted by the measurement unit 115 to an averaging unit 335-b. This scan, and subsequent transmission, of the analog signals is repeated for each of the rows of two or more fields in a manner described above. The analog signals received by the averaging unit 335-b may comprise a voltage or current representative of the measured voltage levels, and the measurement unit 115 may include one or more drivers to drive the analog signal.

The averaging unit 335-b in this embodiment averages the analog signals representative of the pixels from one or more fields to produce averaged pixel representations. One manner in which to implement this averaging is through the use of a low-pass filter, which filters the higher frequency noise and averages the driven output from the measuring unit over certain periods. In one embodiment, corresponding pixels are averaged through the use of certain delay line configurations. The low-pass filter may comprise a simple RC filter, or may comprise a variety of other configurations as known in the art. The averaged analog output is transmitted to the ADC 330-b and digitized. As noted above, the measurement unit 115 may repeat the measurements for each of n-number of fields of the array over a given pixel period. In some embodiments, the analog averaging is limited to n-1 of the fields. The output from the ADC 330-b is received and processed by an image processing unit 345. For each exposure period, image data is produced which may include discrete sets of image data for each field, each set comprising an image. The output of an image processing unit is discussed in greater detail below.

Figure 5:
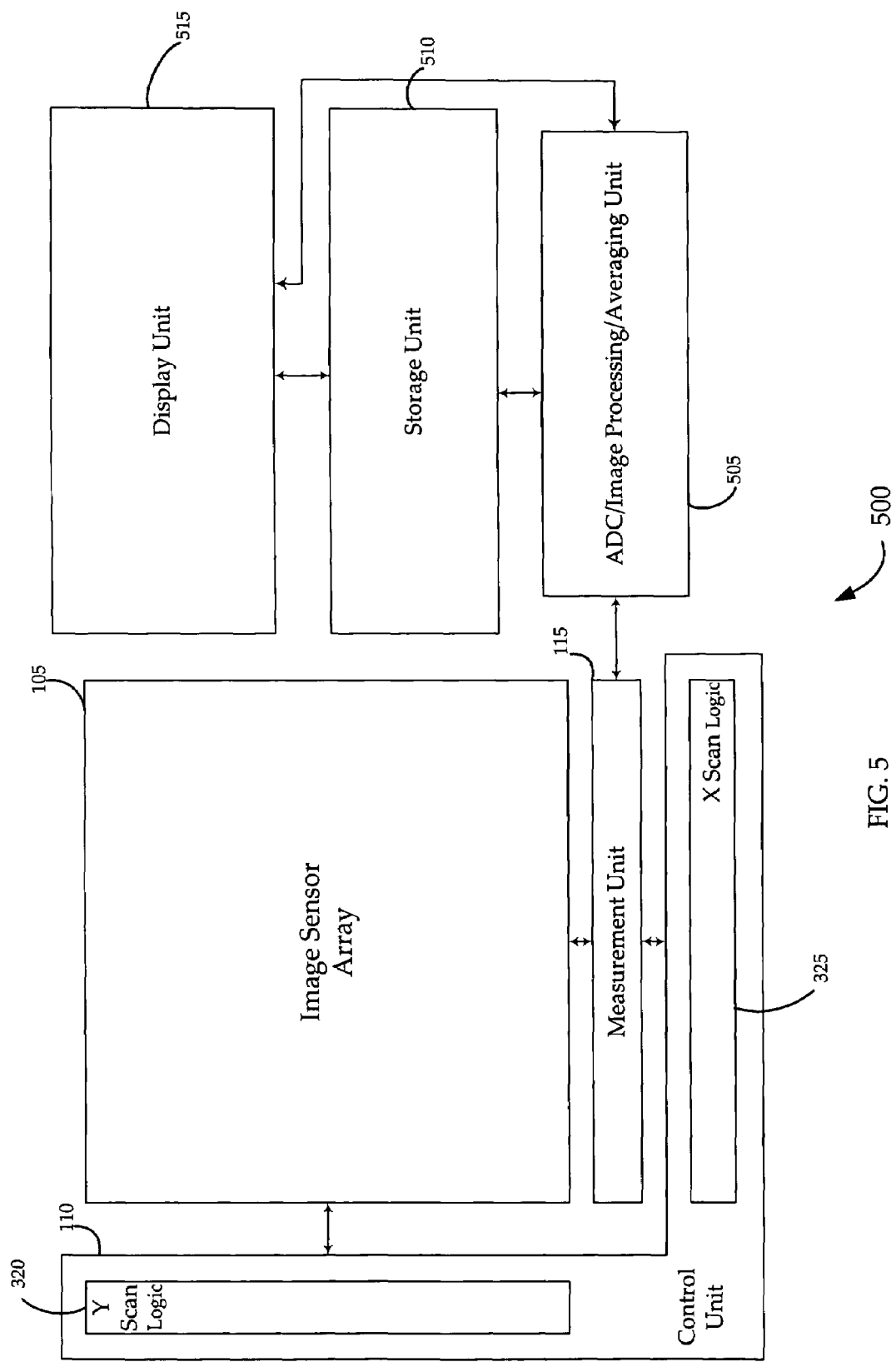
FIG. 5 is a simplified block diagram illustrating an exemplary configuration of an imaging system according to various embodiments of the present invention.

FIG. 5 illustrates yet another imaging system 500 embodiment showing how the device 340 of FIG. 3 or 4 may be integrated with other components to provide additional functionality. This imaging system includes a single ADC/image processing/averaging unit 505. This unit may comprise any number of discrete components, in a number of varied configurations (e.g., it may comprise the ADC 330, the averaging unit 335, and the image processing unit 345). Thus, regardless of whether corresponding pixel representations are averaged before or after the ADC, a raw digital output is then processed by the image processing component (e.g., image processing unit 340) of the ADC/image processing/averaging unit 505. The image processing component may perform very limited processing, due to the real-time nature and possible power limitations associated with preview mode in mobile devices. However, in other embodiments, the image processing component may transform the digital sets into YUV or RGB data, going through image reconstruction and correction algorithms. Also, Binning may be used in combination with interlaced scanning and averaging techniques described above, and this may be implemented by the ADC/image processing/averaging unit 505. Demosaicing, dynamic range enhancement, digital gain, filter downscaling, sharpening or blurring, color correction, gamma correction, RGB to YUV conversion, YUV to RGB conversion and cropping for display may all be performed by the image processing component. The image processing component may also compress the data, for example, into a JPEG or MPEG stream.

Thus, the ADC/image processing/averaging unit 505 processes the data received to produce image data comprising a number of generated images. For each exposure period, the produced image data may include discrete sets of image data for each field. The image data for each field may, thus, comprise an image representative of the rows of that field. For example, returning to FIG. 2A, for n=2 interlace mode, a first set of image data may comprise an image of the first field (RP1, RP3, RP5, RP7, RP9), while a second set of image data may comprise an image of the second field (RP2, RP4, RP6, RP8, RP10). For n=3, a first set of image data may comprise an image of the first field (RP1, RP4, RP7), while a second set of image data may comprise an image of the second field (RP2, RP5, RP8), and a third set of image data may comprise an image of the third field (RP 3, RP6, RP9). There may be more than three fields in other embodiments. Additional sets of image data, the number depending on the n of the interlace mode, are generated for each subsequent period of exposure to create moving images. In some embodiments, the image sensor array 105, the measurement unit 115, the control unit 110, and the ADC/image processing/averaging unit 505 are implemented on a single CMOS integrated circuit.

FIG. 5 further illustrates how the device 340 of FIGS. 3A and 4 may be integrated with other components to provide additional functionality. This imaging system 500 may, for example, be integrated into an existing mobile phone, PDA, portable digital music player, or any other mobile device. Also, this imaging system 500 may comprise components of a stand alone camera. Numerous other applications are possible, as well.

In this embodiment, the imaging system 500 further includes a storage unit 510 in communication with the ADC/image processing/averaging unit 505. Thus, both the raw digital representation of the pixel measurements, and the generated image produced by the ADC/image processing/averaging unit 505, may be stored in the storage unit 510. The storage unit 510 may include one or more devices for storing data, such as random access memory (RAM), core memory, magnetic disk storage mediums, optical storage mediums, flash memory devices or other machine readable mediums for storing information. The term includes, but is not limited to, portable or fixed storage devices, optical storage devices, a sim card, other smart cards, and various other mediums capable of storing, containing or carrying instructions or data.

Moreover, the imaging system 500 of this embodiment further includes a display unit 515 in communication with the storage unit 510 and the ADC/image processing/averaging unit 505. The display unit 515 may, therefore, display real-time images produced directly from the ADC/image processing/averaging unit 505. Alternatively, the display unit 515 may display images stored in the storage unit 510. The display unit 515 may comprise a stand alone or integrated LCD, plasma, OLED, CRT, projection, or other display.

To understand how the image data is displayed, it will again be helpful to refer to FIG. 2A, for n=2 interlace mode. Assume that the image sensor array 200 is exposed to light for time x. A first set of image data comprising an image of the first field (RP1, RP3, RP5, RP7, RP9) may be displayed first for approximately time x/2. A second set of image data comprising an image of the second field (RP2, RP4, RP6, RP8, RP10) may then be displayed for approximately time x/2. This process may be repeated for a number of exposure periods to produce motion video. Other display periods may be used in the alternative.

Further discussion of this embodiment of the display unit is also merited. Assume that the display unit in this embodiment includes 10 lines, lines 1-10. Consider line 3, in which the first row of RP3 is displayed when the first field is displayed. In this example, when the second field is displayed, line 3 comprises an average of the first row of RP2 and the first row of RP4. Consider line 5, in which the first row of RP5 is displayed when the first field is displayed. In this example, when the second field is displayed, line 5 comprises an average of the first row of RP4 and the first row of RP6. A variety of other configurations for the display unit are available, as well, as is clear to those skilled in the art.

Next, consider n=3 interlace mode. Assume that the image sensor array 200 is exposed to light for time x, and includes 9 row-pairs. A first set of image data comprising an image of the first field (RP1, RP4, RP7) may be displayed first for approximately time x/3. A second set of image data comprising an image of the second field (RP2, RP5, RP8) may then be displayed for approximately time x/3. A third set of image data comprising an image of the third field (RP3, RP6, RP9) may then be displayed for approximately time x/3. Other display periods may be used in the alternative, and again note that the process may be repeated to produce motion video.

Figure 6:
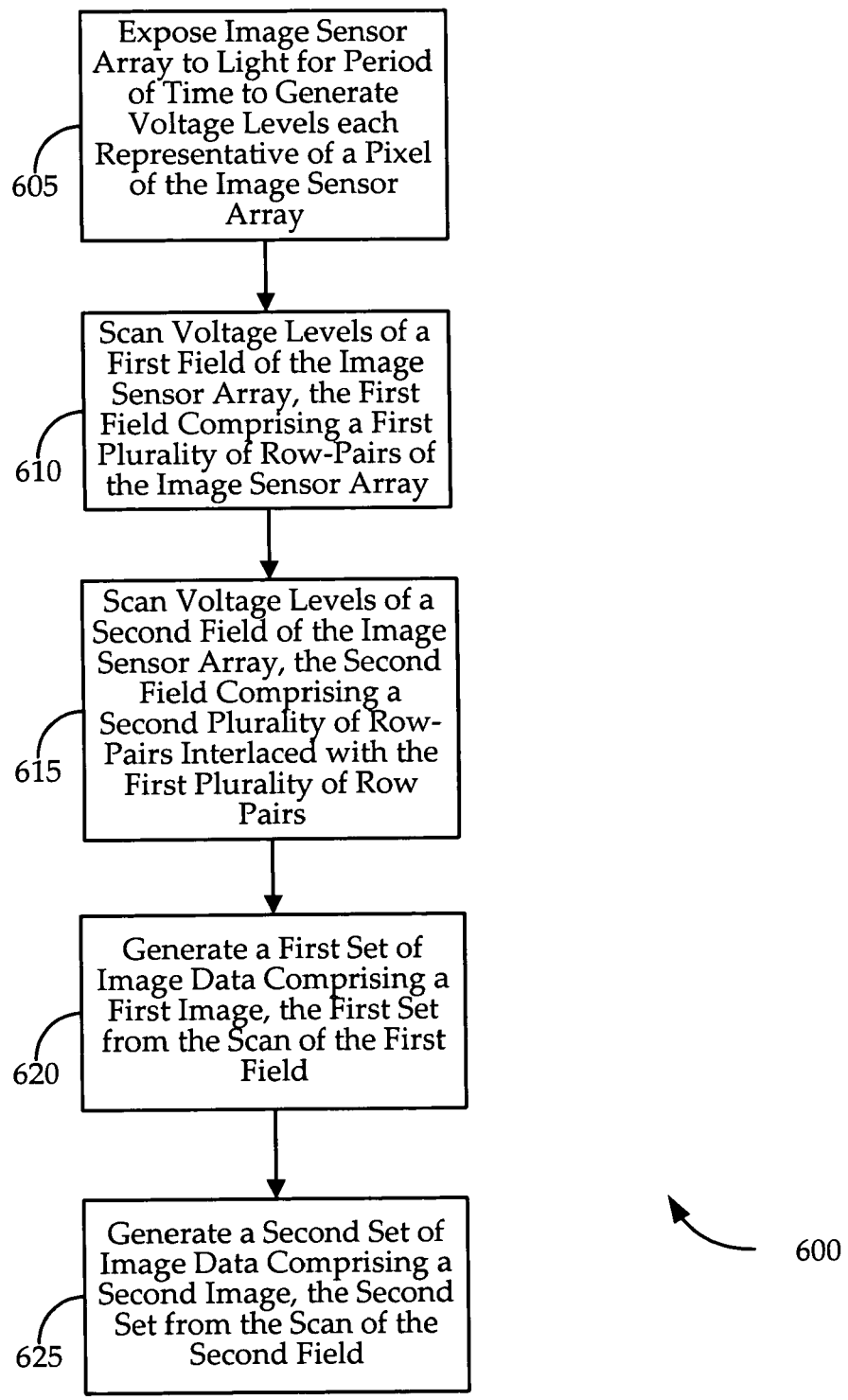
FIG. 6 is a flowchart illustrating a method of interlaced scanning of an image sensor array according to various embodiments of the present invention.

FIG. 6 sets forth an exemplary embodiment 600 of the invention illustrating a method of interlaced scanning of an image sensor array according to various embodiments of the present invention. At block 605, an image sensor array is exposed to light for a period of time to generate voltage levels each representative of a pixel of the image sensor array. At block 610, the voltage levels of a first field of the image sensor array are scanned, the first field comprising a first plurality of row-pairs of the image sensor array. At block 615, voltage levels of a second field of the image sensor array are scanned, the second field comprising a second plurality of row-pairs interlaced with the first plurality of row-pairs. At block 620, a first set of image data comprising a first image is generated, the first set from the scan of the first field. At block 625, a second set of image data comprising a second image is generated, the second set from the scan of the second field.

Figure 7:
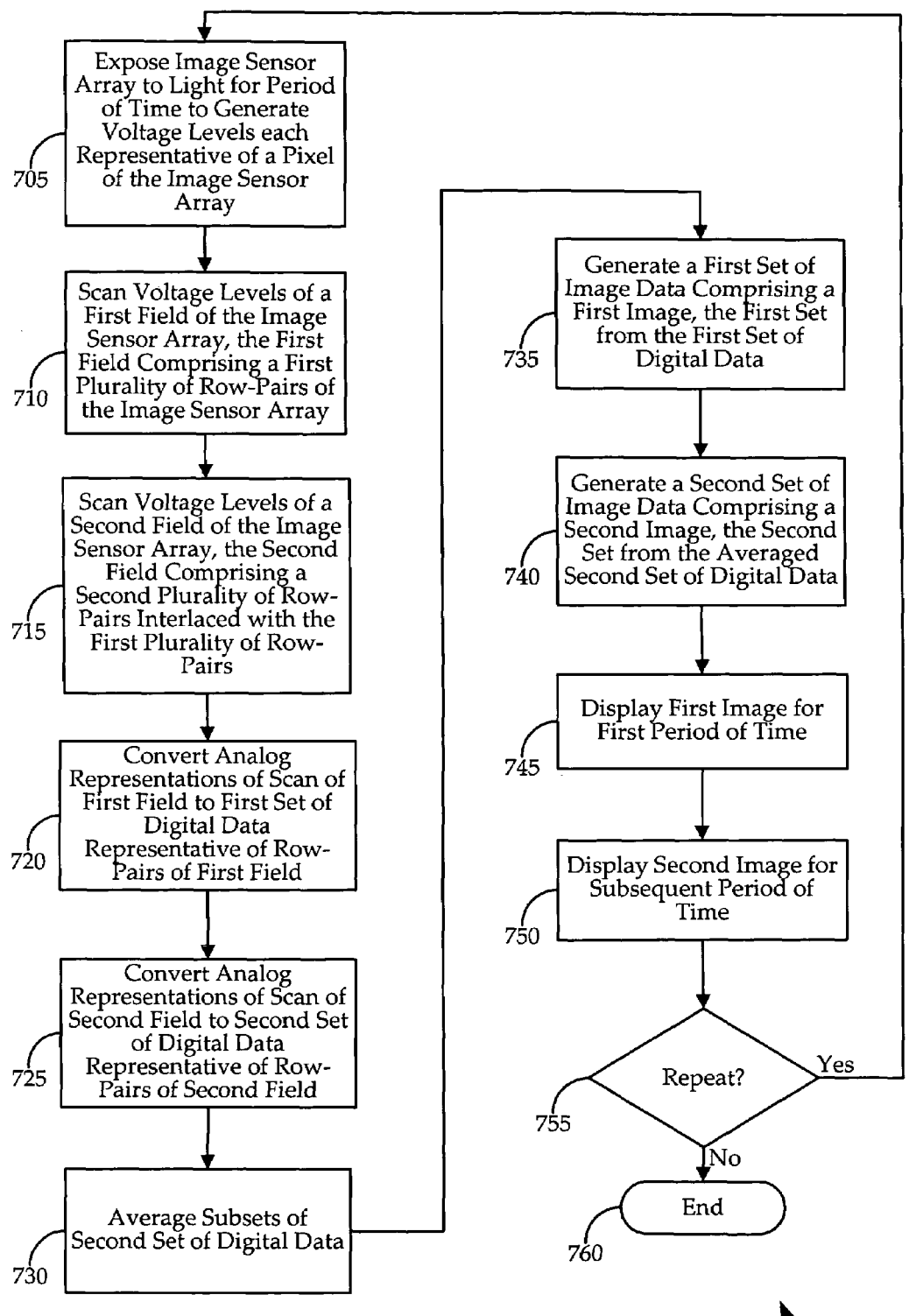
FIG. 7 is a flowchart illustrating a method of interlaced scanning of an image sensor array, along with averaging certain output, according to various embodiments of the present invention.

FIG. 7 illustrates another exemplary embodiment 700 of the invention illustrating a method of interlaced scanning of an image sensor array, along with averaging certain output, according to various embodiments of the present invention. At block 705, an image sensor array is exposed to light for a period of time to generate voltage levels, each representative of a pixel of the image sensor array. At block 710, the voltage levels of a first field of the image sensor array are scanned, the first field comprising a first plurality of row-pairs of the image sensor array. At block 715, voltage levels of a second field of the image sensor array are scanned, the second field comprising a second plurality of row-pairs interlaced with the first plurality of row-pairs. At block 720, analog representations of the scan of the first field are converted to a first set of digital data representative of the row-pairs of the first field. At block 725, analog representations of the scan of the second field are converted to a second set of digital data representative of row-pairs of the second field.

At block 730, subsets of a second set of digital data are averaged. At block 735, a first set of image data comprising a first image is generated from the first set of digital data. At block 740, a second set of image data comprising a second image is generated from the averaged second set of digital data. At block 745, the first image is displayed for a first period of time, and at block 750, the second image is displayed for a subsequent period of time. At block 755, a decision is made whether the process will repeat. If so, the process returns to blocks 705-750 for exposure, and subsequent scanning, averaging, etc., perhaps to produce motion video. If no repetition is called for, the method ends at block 760.

Figure 8:
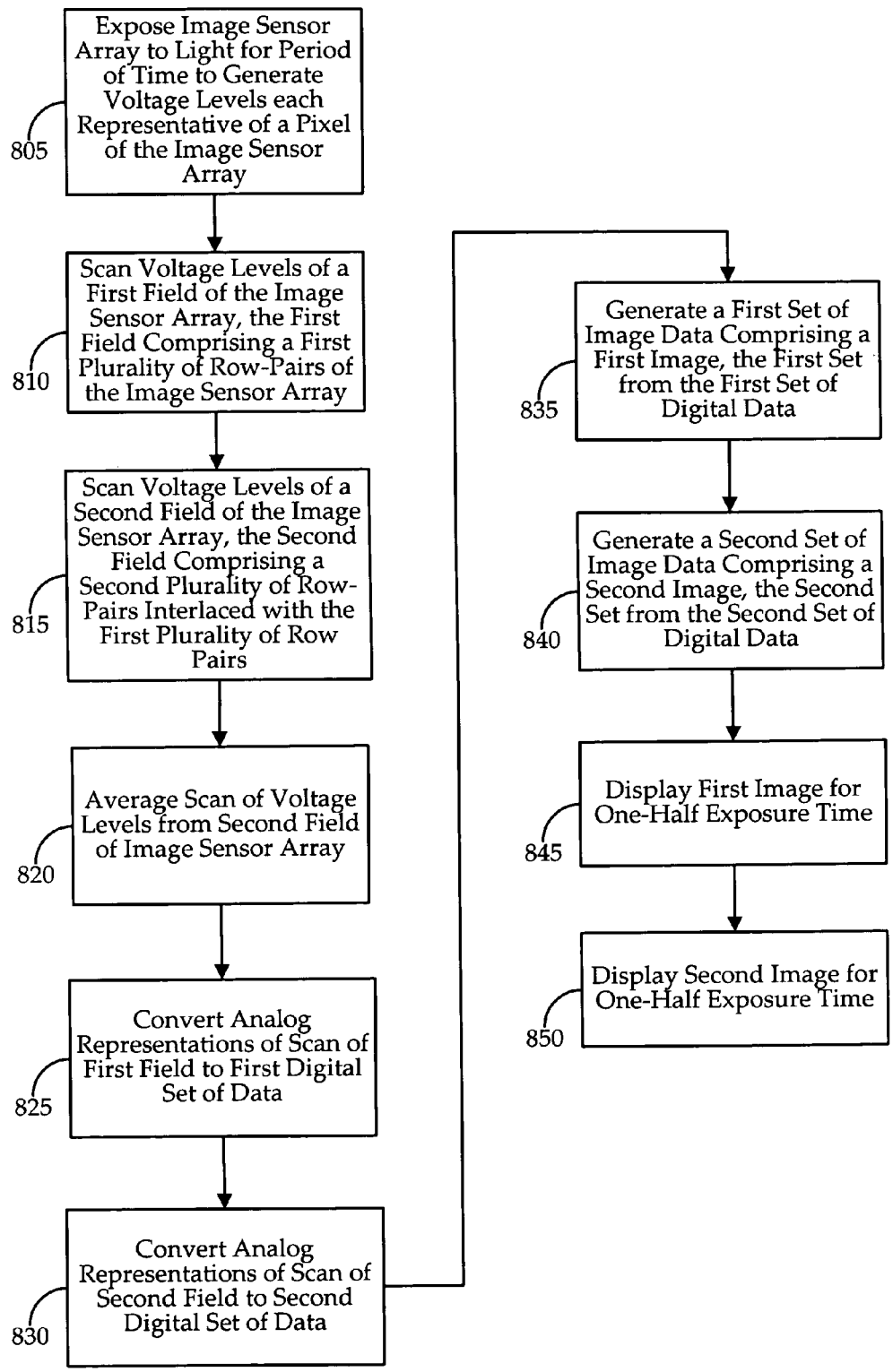
FIG. 8 is a flowchart illustrating an alternative method of interlaced scanning of an image sensor array, along with averaging certain output, according to various embodiments of the present invention.

FIG. 8 illustrates an alternative exemplary embodiment 800 of the invention illustrating a method of interlaced scanning of an image sensor array, along with averaging certain output, according to various embodiments of the present invention. At block 805, an image sensor array is exposed to light for a period of time to generate voltage levels, each representative of a pixel of the image sensor array. At block 810, the voltage levels of a first field of the image sensor array are scanned, the first field comprising a first plurality of row-pairs of the image sensor array. At block 815, voltage levels of a second field of the image sensor array are scanned, the second field comprising a second plurality of row-pairs interlaced with the first plurality of row-pairs. At block 820, voltage levels from the scan of the second field of image sensor array are averaged. At block 825, analog representations of the scan of the first field are converted to a first digital set of data. At block 830, the averaged analog representations of the scan of the second field are converted to a second digital set of data.

At block 835, a first set of image data comprising a first image is generated, the first set from the first set of digital data. At block 840, a second set of image data comprising a second image is generated, the second set from the second set of digital data. The first image is then displayed for approximately one-half the exposure time at block 845. The second image is then displayed for approximately one-half the exposure time at block 850.

Imaging systems and methods have been described to provide n-way interlaced scan of a number of row-pairs, where n is the vertical down-scaling factor. The exposure time of such pairs of image rows may be controlled to provide exposure time equal to the number of fields multiplied by the scan time of one field. Certain flicker avoidance techniques were discussed as well, wherein row-pairs scanned in one field are output as are, while row-pairs scanned in other fields are interpolated to derive spatial intermediate values which correspond to row-pairs located at the same vertical position as the row-pairs being scanned in the first field.

It should be noted that the imaging systems and methods discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. It is also worth noting that in the examples, an array is shown with a relatively small number of rows. This is done so as to be able to explain various embodiments of the invention without unnecessarily repeating details. Various embodiments are, therefore, applicable to image sensor arrays comprising a wide range of rows.

Also, it is noted that the embodiments may be described as a process which is depicted as a flowchart or a block diagram. Although a flowchart or block diagram may describe the operations as a sequential process, many of the operations can be performed in parallel or concurrently. In addition, the order of the operations may be re-arranged. A process is terminated when its operations are completed, but could have additional steps not included in the figures.

Furthermore, certain elements of the embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method of scanning an image sensor array to generate sets of image data, the method comprising:
   (a) exposing the image sensor array to light for an exposing period of time to generate a plurality of voltage levels each representative of a pixel of the image sensor array;
   (b) scanning voltage levels, from among the plurality of voltage levels, corresponding to a first field of the image sensor array, the first field comprising a first plurality of row-pairs of the image sensor array, a row-pair being a pair of adjacent rows of pixels in the image sensor array;
   (c) scanning voltage levels, from among the plurality of voltage levels, corresponding to a second field of the image sensor array, the second field comprising a second plurality of row-pairs interlaced with the first plurality of row-pairs;
   (d) generating a first set of image data comprising a first image, the first set of image data being generated based on the scan of the first field;
   (e) generating a second set of image data comprising a second image, the second set of image data being generated based on the scan of the second field;
   (f) generating an averaged row pair by averaging a first row-pair from the second plurality of row-pairs with a second row-pair from the second plurality of row-pairs, the first and second row-pairs each being adjacent to a selected row-pair of the first plurality of row-pairs;
   (g) displaying the first set of image data, including the selected row-pair; and
   (h) subsequently displaying the second set of image data including the averaged row-pair, wherein the averaged row-pair is displayed in a same location as the selected row-pair.

2. The method of claim 1, the method further comprising:
   (i) averaging subsets of the second plurality of row-pairs, wherein the second set of image data comprises the averaged row-pairs.

3. The method of claim 2, wherein the averaging comprises:
   averaging subsets of the voltage levels corresponding to the second field.

4. The method of claim 2, wherein: the voltage levels corresponding to the second field are converted to sets of digital data each representative of a different row-pair of the second plurality of row-pairs; and the averaging comprises averaging subsets of the sets of digital data.

5. The method of claim 1, wherein the first set of image data is displayed for a first period of time; and the second set of image data is subsequently displayed for a second period of time.

6. The method of claim 5, wherein: the first period of time substantially comprises one-half the exposing period of time; and the second period of time substantially comprises one-half the exposing period of time.

7. The method of claim 1, further comprising:
(i) scanning voltage levels, from among the plurality of voltage levels, corresponding to a third field of the image sensor array, the third field comprising a third plurality of row-pairs interlaced with the first and second pluralities of row-pairs; and
(j) generating a third set of image data, the third set of image data being generated based on the scan of the third field.

8. The method of claim 7, the method further comprising:
(k) displaying the third set of image data,
wherein the first set of image data is displayed for a first period of time, the second set of image data is subsequently displayed for a second period of time, and the third set of image data is subsequently displayed for a third period of time, wherein the first, second, and third periods of time combined substantially comprise the exposing period of time.

9. The method of claim 7, further comprising:
(k) scanning voltage levels, from among the plurality of voltage levels, corresponding to a fourth field of the image sensor array, the fourth field comprising a fourth plurality of row-pairs interlaced with the first, second, and third pluralities of row-pairs; and
(l) generating a fourth set of image data, the fourth set of image data being generated based on the scan of the fourth field.

10. The method of claim 1, the method further comprising:
repeating steps (a), (b), (c), (d), (e), (f), (g), and (h) for each of a plurality of additional periods of time.

11. An imaging system for scanning fields of an image sensor array, the system comprising:
an image sensor array comprising a plurality of rows of pixels, wherein at least a subset of the pixels are each associated with a voltage level generated by exposing the image sensor array to light for an exposing period of time;
a measurement unit configured to measure voltage levels associated with the subset of pixels;
a control unit configured to control the measurement unit to
scan voltage levels corresponding to a first field of the image sensor array, the first field comprising a first plurality of row-pairs of the image sensor array, a row-pair being a pair of adjacent rows of pixels, from among the rows of pixels of the image sensor array, and
scan voltage levels corresponding to a second field of the image sensor array, the second field comprising a second plurality of row-pairs interlaced with the first plurality of row-pairs;
an averaging unit configured to generate an averaged row pair by averaging a first row-pair from the second plurality of row-pairs with a second row-pair from the second plurality of row-pairs, the first and second row-pairs each being adjacent to a selected row-pair of the first plurality of row-pairs; and
a display unit configured to
display a first image based on the scanning of the first field, the first image including the selected row-pair, and
subsequently display a second image based on the scanning of the second field, the second image including the averaged row-pair, wherein the averaged row-pair is displayed in a same location as the selected row-pair.

12. The imaging system of claim 11, the system further comprising:
an image processing unit configured to
generate a first set of image data comprising the first image, the first set of image data being generated based on the scan of the first field, and
generate a second set of image data comprising the second image, the second set of image data being generated based on the scan of the second field.

13. The imaging system of claim 12, wherein the averaging unit is configured to average subsets of the second plurality of row-pairs, wherein the second set of image data comprises the averaged row-pairs.

14. The imaging system of claim 13, wherein:
the averaging unit is configured to average subsets of the voltage levels corresponding to the second field.

15. The imaging system of claim 13, the system further comprising:
an analog to digital converter configured to convert the voltage levels corresponding to the second field to sets of digital data each representative of a different row-pair of the second plurality of row-pairs,
wherein the averaging unit is configured to average subsets of the sets of digital data.

16. The imaging system of claim 12, wherein the display unit is configured to
display the first set of image data for a first period of time, and
subsequently display the second set of image data for a second period of time.

17. The imaging system of claim 16, wherein: the first period of time substantially comprises one-half the exposing period of time; and the second period of time substantially comprises one-half the exposing period of time.

18. The imaging system of claim 11, wherein:
the control unit is further configured to control the measurement unit to scan voltage levels corresponding to additional fields of the image sensor array, each additional field comprising an additional plurality of row-pairs interlaced with the first and second pluralities of row-pairs; and
the imaging system further comprises an image processing unit configured to
generate a first set of image data comprising the first image, the first set of image data being generated based on the scan of the first field;
generate a second set of image data comprising the second image, the second set of image data being generated based on the scan of the second field; and
generate additional sets of image data, each comprising an additional image, each additional set of image data being generated based on the scan of a respective additional field.

19. The imaging system of claim 18, wherein the display unit is further configured to display the first set of image data for a first period of time;
subsequently display the second set of image data for a second period of time; and
subsequently display each of the additional sets of image data in succession for additional periods of time,
wherein the first, second, and additional periods of time combined substantially comprise the exposing period of time.

20. The imaging system of claim 11, wherein the image sensor array comprises a CMOS imaging sensor.

21. The imaging system of claim 11, wherein the image sensor array further comprises a Bayer filter mosaic.

22. An imaging system for generating sets of image data, the system comprising:
an image sensor array comprising a plurality of rows of pixels, wherein at least a subset of the pixels are each associated with a voltage level generated by exposing the image sensor array to light for a period of time;
a measurement unit configured to measure the voltage levels associated with the subset of the pixels;
a control unit configured to control the measurement unit to
scan voltage levels corresponding to a first field of the image sensor array, the first field comprising a first set of rows, from among the plurality of rows of the image sensor array; and
scan voltage levels corresponding to a second field of the image sensor array, the second field comprising a second set of rows, from among the plurality of rows of the image sensor array, at least a selection of the first set of rows being interlaced with at least a selection of the second set of rows;
an averaging unit configured to generate an averaged row-pair by averaging a first row-pair from the second set of rows with a second row-pair from the second set of rows, the first and second row-pairs each being adjacent to a selected row-pair of the first set of rows;
an image processing unit configured to
generate a first set of image data comprising a first image, the first set of image data being generated based on the scan of the first set of rows; and
generate a second set of image data comprising a second image, the second set of image data being generated based on the averaged row-pair of the second set of rows; and
a display unit configured to
display the first image based on the first set of image data, the first image including the selected row-pair, and
subsequently display the second image based on the second set of image data, the second image including the averaged row-pair,
wherein the averaged row-pair is displayed in a same location as the selected row-pair.

23. The imaging system of claim 22, wherein,
the image sensor array is configured to produce a set of grayscale images; and
the plurality of rows alternate, at each row-pair, between a row-pair of the first field and a row-pair of the second field.

* * * * *